Patented Feb. 5, 1929.

1,700,914

UNITED STATES PATENT OFFICE.

CARLO TONIOLO, OF MILAN, ITALY.

PROCESS FOR THE MANUFACTURE OF AMMONIUM NITRATE IN WATER SOLUTION AND SIMULTANEOUS CONCENTRATION THEREOF.

No Drawing. Application filed January 27, 1926, Serial No. 84,250, and in Italy February 7, 1925.

In the combination between $NH_3$ and $HNO_3$ a considerable amount of heat is developed.

The reaction:

$$NH_4OH + HNO_3 = NH_4NO_3 + H_2O$$

sets free 12.5 cal. for each gram-molecule of the reagents. Besides, further about 8.5 cal. are developed if the $NH_3$ is used in the gaseous state instead of in water solution. For each kilo $NH_4NO_3$ a total of about 260 cal. will be developed, viz, as much as would suffice to evaporate nearly half a kilo of water.

As $HNO_3$ can be used in concentrated solutions and $NH_3$ can be used in 100% concentration, the resulting ammonium nitrate could contain just half a kilo $H_2O$ per kilo salt produced and if the whole of the reaction heat were utilized without any losses a dry product would be obtained without any further steps.

In practice it is by no means easy to utilize the reaction heat in full there is however no doubt that with such heat a considerable proportion of the water of the acid originally employed can be evaporated.

In the processes thus far industrially used it has been sought to eliminate this heat (which would raise the temperature so as to bring about decomposition and losses of the reagents) by cooling down the solution inside of which the reaction takes place for instance by causing the solution to traverse coils immersed in cold water or by other similar means. That is to say, the irrational course has been taken of positively retaining in the nitrate the water that would evaporate spontaneously, then to be obliged to resort to the expensive evaporation of the solution by means of fuels.

The present invention has for its object the rational actuation of the process, which consists in letting the water evaporate spontaneously during the neutralization. Further, taking advantage of the fact that water can be passed into a gaseous state in a gas current below boiling temperature, I have succeeded in achieving my object with temperatures below the ebullition point of concentrated nitrate solutions.

Since, when operating in a current of gases, also the part pressure of the steam plays a role, the novel method corresponds to a reduced-pressure-boiling without need of the complicated and expensive apparatus that would otherwise be required by the concentration "in vacuo".

The process may be carried out by mingling gaseous $NH_3$ with air or non-condensing gases and by causing this mixture to react on more or less concentrated $HNO_3$ to which has been added a solution of this same salt (mother liquor from previous working).

The air or gases mentioned may be more or less heated when it is desired to secure a more rapid concentration or even only to provide additional heat in the event of the heat developed by the chemical reaction not being sufficient to achieve the concentration wanted and to make up for the unavoidable heat losses.

The gaseous mixture can be bubbled through the liquid, or it can be caused to rise in an absorption tower in which the liquid is circulated, or it can be passed through a chamber in which the liquid is sprayed, or finally it can be dealt with by any other method capable of bringing the gas into intimate contact with the liquid.

*Example.*—400 kilos of ammonium nitrate solution or mother liquor of 80% concentration, heated up to 80°–100° C., are circulated in an ordinary absorption tower by means of a centrifugal pump. To this liquor 94 kilos of 50% $HNO_3$ are admixed; finally 12,6 kilos $NH_3$ in gaseous conditions diluted in 300–400 cub. m. air, likewise heated to 80°–100° C. are caused to rise in the absorption tower.

When the neutralization is completed, 474,5 kilos of 50% nitrate solution are obtained.

If we deduct the 74,5 kilos, we have again the initial 400 kilos lye. Whereas these 74,5 kilos contain the newly formed 59,6 kilos of $NH_4NO_3$ at a concentration of 80%, with the ordinary methods the concentration degree would be only 54%.

Having now particularly described and ascertained the nature of my said invention and in what manner the same is to be performed, I declare that what I claim is:—

1. The process of preparing aqueous solutions of ammonium nitrate which comprises contacting hot nitric acid solutions with heated ammonia gas, sufficient water being present in the original nitric acid solution so that concentrated ammonium nitrate solutions are obtained.

2. The process of preparing aqueous ammonium nitrate solutions which comprises contacting hot nitric acid solutions with heated ammonia gas containing air as a diluent, sufficient water being present so that concentrated nitrate solutions are obtained.

3. The process of preparing concentrated aqueous solutions of ammonium nitrate which comprises contacting a hot dilute solution of ammonium nitrate containing nitric acid with heated ammonia gas, sufficient water being present to prevent a dry product being obtained.

4. The process of preparing concentrated aqueous ammonium nitrate solutions which comprises contacting hot dilute ammonium nitrate solutions containing added free nitric acid with heated ammonia gas containing an inert gaseous diluent, sufficient water being present to prevent a dry product being obtained.

Signed at Milan (Italy), this 13th day of January, 1926.

CARLO TONIOLO.